US011383613B2

(12) United States Patent
Yan et al.

(10) Patent No.: US 11,383,613 B2
(45) Date of Patent: Jul. 12, 2022

(54) POWER DISTRIBUTION SYSTEM AND METHOD FOR CHARGING MULTIPLE ELECTRIC VEHICLES

(71) Applicant: Delta Electronics (Shanghai) Co., Ltd., Shanghai (CN)

(72) Inventors: Chao Yan, Shanghai (CN); Shouzheng Wang, Shanghai (CN); Jui-Yuan Hsu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/950,881

(22) Filed: Nov. 17, 2020

(65) Prior Publication Data

US 2021/0155107 A1 May 27, 2021

(30) Foreign Application Priority Data

Nov. 22, 2019 (CN) .......................... 201911152482.1

(51) Int. Cl.
*B60L 53/67* (2019.01)
*B60L 53/31* (2019.01)
(Continued)

(52) U.S. Cl.
CPC .............. *B60L 53/67* (2019.02); *B60L 53/10* (2019.02); *B60L 53/31* (2019.02); *H02J 7/0013* (2013.01); *H02J 7/02* (2013.01)

(58) Field of Classification Search
CPC .................................................... B60L 53/67
(Continued)

(56) References Cited

U.S. PATENT DOCUMENTS

| 5,594,318 A * | 1/1997 | Nor | H02J 50/40 |
| | | | 320/108 |
| 8,294,420 B2 * | 10/2012 | Kocher | B60L 53/11 |
| | | | 320/109 |

(Continued)

FOREIGN PATENT DOCUMENTS

| CN | 102892617 B | 10/2016 |
| CN | 106945540 A | 7/2017 |

(Continued)

OTHER PUBLICATIONS

Corresponding European search report dated Apr. 26, 2021.
Corresponding China office action dated Mar. 30, 2022.

*Primary Examiner* — Jerry D Robbins
(74) *Attorney, Agent, or Firm* — CKC & Partners Co., LLC

(57) ABSTRACT

Embodiments of the present disclosure provide a power distribution system and a method for charging multiple electric vehicles. The power distribution system includes: an alternating-current source, configured to provide a first electric power; an energy storage device, configured to provide a second electric power, the first electric power and the second electric power together constitute a total supply power; a charging module, including multiple charging units, where each of the charging units is electrically coupled to the alternating-current source and the energy storage device through an alternating-current bus, and the charging units are used to charge the electric vehicles; and a power management module, performing a signal transmission with the alternating-current source, the energy storage device and the charging module through a signal bus, and being configured to select a corresponding orderly charging mode according to the total supply power and total required power of the charging module.

20 Claims, 2 Drawing Sheets

(51) Int. Cl.
*B60L 53/10* (2019.01)
*H02J 7/00* (2006.01)
*H02J 7/02* (2016.01)

(58) Field of Classification Search
USPC .......................................................... 320/109
See application file for complete search history.

(56) References Cited

U.S. PATENT DOCUMENTS

| | | | |
|---|---|---|---|
| 8,731,730 B2* | 5/2014 | Watkins | B60L 53/14 |
| | | | 700/292 |
| 8,841,881 B2* | 9/2014 | Failing | B60L 53/124 |
| | | | 320/109 |
| 10,479,210 B2* | 11/2019 | Beekmann | B60L 55/00 |
| 11,007,885 B2* | 5/2021 | Koolen | B60L 53/11 |
| 2004/0130292 A1* | 7/2004 | Buchanan | B60L 53/53 |
| | | | 320/116 |
| 2010/0134067 A1 | 6/2010 | Baxter et al. | |
| 2013/0009599 A1* | 1/2013 | Yukizane | H02J 13/0062 |
| | | | 320/109 |
| 2013/0138981 A1 | 5/2013 | Wang et al. | |

FOREIGN PATENT DOCUMENTS

| | | |
|---|---|---|
| CN | 108674247 A | 10/2018 |
| CN | 109327034 A | 2/2019 |
| CN | 109572454 A | 4/2019 |
| CN | 106712166 B | 10/2019 |
| EP | 2683055 A1 | 1/2014 |
| WO | 2012146306 A2 | 11/2012 |
| WO | 2019126806 A1 | 6/2019 |

\* cited by examiner

POWER DISTRIBUTION SYSTEM AND METHOD FOR CHARGING MULTIPLE ELECTRIC VEHICLES

CROSS-REFERENCE TO RELATED APPLICATION

This application claims priority to Chinese Patent Application No. 201911152482.1, filed on Nov. 22, 2019, which is hereby incorporated by reference in its entirety.

TECHNICAL FIELD

Embodiments of the present disclosure relate to the technical field of charging electric vehicles, and in particular, to a power distribution system and a method for charging multiple electric vehicles.

BACKGROUND

With the development of the economic level, cars have become a necessity for every household to travel. As people's awareness of environmental protection is gradually increasing, electric vehicles are becoming more and more popular as new clean energy vehicles that only need to be charged by a charger instead of using gasoline.

There are generally two types of electric vehicle supply equipment (EVSE) at present, one is all-in-one product configuration, and the other is cabinet-dispenser product configuration. Both of the above EVSEs can directly charge the electric vehicles.

However, with the increasing in the number of the electric vehicles, the number of charging times and the amount of electricity required are increasing, and the existing EVSE can no longer meet charging requirements of the electric vehicles.

SUMMARY

Embodiments of the present disclosure provide a power distribution system and a method for charging multiple electric vehicles to meet the charging requirement of the electric vehicles.

In a first aspect, an embodiment of the present disclosure provides a power distribution system for charging multiple electric vehicles, including: an alternating-current source, configured to provide a first electric power;

an energy storage device, configured to provide a second electric power, where the first electric power and the second electric power together constitute a total supply power of the system;

a charging module, including multiple charging units, where each of the charging units is electrically coupled to the alternating-current source and the energy storage device through an alternating-current bus, and the charging units are used to charge the electric vehicles; and a power management module, performing a signal transmission with the alternating-current source, the energy storage device and the charging module through a signal bus, and configured to select a corresponding orderly charging mode according to the total supply power and a total required power of the charging module, where the orderly charging mode includes an average distribution mode, a dynamic distribution mode, a FIFO distribution mode and a dynamic proportional mode, the total required power of the charging module is a sum of respective required power of the charging units, and the required power of each of the charging units is determined according to an initial required charging power of an electric vehicle corresponding to the each of the charging units.

In a second aspect, an embodiment of the present disclosure provides a control method for charging multiple electric vehicles by using the power distribution system according to the first aspect, the power distribution system including the alternating-current source, the energy storage device, the charging module and the power management module, where the control method includes the following steps:

providing the first electric power by the alternating-current source;

providing the second electric power by the energy storage device, where the sum of the first electric power and the second electric power is the total supply power;

electrically coupling the charging module to the alternating-current source and the energy storage device through the alternating-current bus, where the charging module includes at least two charging units, each of the charging units is used to charge an electric vehicle;

acquiring the total required power of the charging module, where the total required power of the charging module is a sum of respective required power of the charging units, and the required power of each of the charging units is determined according to the initial required charging power of an electric vehicle corresponding to the each of the charging units; and selecting a corresponding orderly charging mode by the power management module according to the total supply power and the total required power, where the orderly charging mode includes an average distribution mode, a dynamic distribution mode, a FIFO distribution mode and a dynamic proportional mode.

BRIEF DESCRIPTION OF THE DRAWINGS

In order to more clearly illustrate the technical solutions in the embodiments of the present disclosure or the prior art, the drawings that need to be used in the embodiments or the prior art description will be briefly introduced below. Obviously, the drawings in the following description are just some embodiments of the present disclosure. For those of ordinary skill in the art, other drawings can be obtained based on these drawings without creative works.

DESCRIPTION OF EMBODIMENTS

The technical solutions in the embodiments of the present disclosure will be clearly and completely described below with reference to the drawings in the embodiments of the present disclosure. Obviously, the described embodiments are only part of the embodiments of the present disclosure, but not all embodiments. Based on the embodiments of the present disclosure, all other embodiments obtained by those skilled in the art without creative works shall fall within the protection scope of the present disclosure.

The terms "first", "second", "third", "fourth", and the like (if present) in the description, claims and the above-mentioned drawings of the present disclosure are used to distinguish similar objects, and are not necessarily used to describe a specific order or sequence. It should be understood that the used data may be interchanged where appropriate so that the embodiments described in the present disclosure can be, for example, implemented in an order other than that illustrated or described herein. Furthermore, the terms "including" and "having" and any variations thereof are intended to cover non-exclusive inclusions, for example, a process, method, system, product, or device that includes a series of steps or units need not be limited to those steps or units that are explicitly listed, but may include other steps or units that are not explicitly listed or inherent to the process, method, product, or device.

Figure 1:
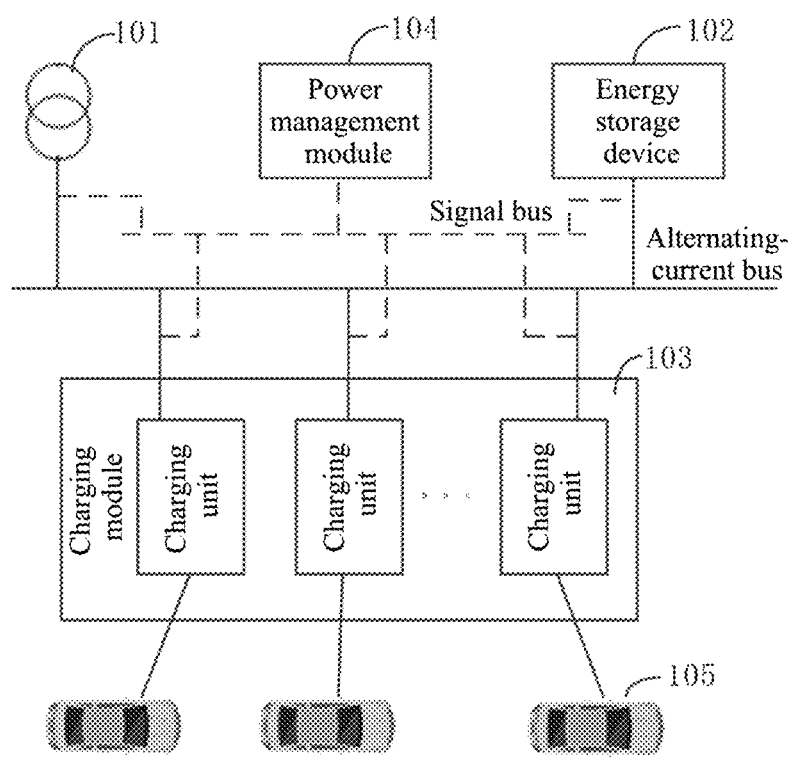
FIG. 1 is a schematic structural diagram of a power distribution system for charging multiple electric vehicles according to an embodiment of the present disclosure.

FIG. 1 is a schematic structural diagram of a power distribution system for charging multiple electric vehicles according to an embodiment of the present disclosure. As shown in FIG. 1, the power distribution system includes:

an alternating-current source 101, configured to provide a first electric power;

an energy storage device 102, configured to provide a second electric power, where the first electric power and the second electric power together constitute a total supply power of the system;

a charging module 103, including multiple charging units, where each of the charging units is electrically coupled to the alternating-current source 101 and the energy storage device 102 through an alternating-current bus, and the charging units are used to charge electric vehicles 105; and a power management module 104, performing a signal transmission with the alternating-current source 101, the energy storage device 102 and the charging module 103 through a signal bus, and being configured to select a corresponding orderly charging mode according to the total supply power and a total required power of the charging module 103, where the orderly charging mode includes an average distribution mode, a dynamic distribution mode, a FIFO distribution mode and a dynamic proportional mode, the total required power of the charging module 103 is a sum of respective required power of the charging units, and the required power of each of the charging units is determined according to the initial required charging power of an electric vehicle 105 corresponding to the each of the charging units.

Specifically, the alternating-current source 101 may be mains supply, that is, the alternating-current source may be configured to provide mains electricity power. The energy storage device 102 may be a battery pack, that is, it may be used as supplementary power of the mains electricity power. Regardless of whether it is a public charging station or a private charging station, there is a peak and valley phenomenon during charging. In a valley stage of charging the electric vehicles, in addition to using the alternating-current source 101 to charge the electric vehicles 105, the alternating-current source 101 may also be used to charge the energy storage device 102. In a peak stage of charging, the alternating-current source 101 and the energy storage device 102 can be used to charge the electric vehicles 105 together. The charging mode adopting the combination of the alternating-current source 101 and the energy storage device 102 improves the charging efficiencies.

Specifically, the charging module 103 may include multiple charging units for charging the electric vehicles 105. Each of the charging units may include a power cabinet and one or more dispensers. The power cabinet is electrically coupled to the alternating-current source 101 and the energy storage device 102 through the alternating-current bus. At the same time, the power cabinet is connected to the dispensers which are used to charge the electric vehicles 105.

Specifically, the power management module 104 generally includes hardware equipment such as a signal acquisition device, a data storage device, a logical decision device, a communication device, and a display device, and also includes software such as a background, an operating system, or a data cloud. The power management module 104, as a control center of the power distribution system, has functions such as a power collection (including voltage and current collection), monitoring of a running status of each of the charging units in the charging module 103, monitoring of a status of the energy storage device 102 and control of input/output power of the energy storage device 102, and selection of an orderly charging mode and sending of a corresponding control instruction. The manner of the signal transmission includes a wired manner, a wireless manner, a combination of the wired manner and wireless manner and the like, where the wired manner may be using RS485, CAN, Ethernet, etc., and the wireless manner may be using 3G, 4G, Bluetooth, WIFI, etc., and there is no limitation here.

Specifically, after the total required power of the connected electric vehicles 105 exceeds the sum of the first electric power provided by the alternating-current source 101 and the second electric power provided by the energy storage device 102, in order to improve the charging efficiencies of the electric vehicles 105 and avoid excessive discharge of the energy storage device 102 and thus damage to the energy storage device 102, the connected electric vehicles 105 may be charged in an orderly charging mode.

In the present disclosure, the corresponding orderly charging mode can be selected according to the total supply power provided by the alternating-current source 101 and the energy storage device 102, and the total required power corresponding to the charging module 103, to orderly charge the electric vehicles 105. This can realize orderly charging of the electric vehicles 105 in the case that the number of the electric vehicles 105 is increasing, improve the charging experience of users, improve charging and discharging efficiencies of the energy storage device 102, and prolong the service life of the energy storage device 102.

The technical solutions of the present disclosure will be described in detail in the following specific embodiments. The following specific embodiments may be combined with each other, and the same or similar concepts or processes may not be repeated in some embodiments.

In a specific embodiment, the orderly charging mode is the average distribution mode, and the power management module distributes power to each of the charging units evenly according to the total supply power and the total required power in combination with the number of the charging units.

Specifically, in the average distribution mode, the number of the charging units needs to be determined. In this case, the determined number of the charging units is all charging units connected to the alternating-current source 101 and the energy storage device 102, regardless of whether or not the electric vehicles 105 are connected. That is, regardless of whether the charging units are connected to the electric vehicles 105, the power distributed to the charging units are the total supply power provided by the alternating-current source 101 and the energy storage device 102 divided by the total number of the charging units, that is, each charging unit obtains a same average distributed power. Then, the connected electric vehicles 105 are charged according to the average distributed power.

In a specific embodiment, the orderly charging mode is the dynamic distribution mode, and the power management module 104 calculates an average power value of each of the charging units according to the total supply power and the total required power in combination with the number of the charging units, and then increases or decreases the average power value according to respective actual required power of the electric vehicles 105 corresponding to the charging units, and distributes power to the charging units according to the increased or decreased power value.

Specifically, the actual required power of the electric vehicles 105 are different, and even may have a large difference between these each other. If all electric vehicles are charged according to a uniform average power distribution, when there is a large difference between the actual required power of the electric vehicles 105, the charging efficiency still cannot be optimized. Therefore, after the average power value distributed to each of the charging units is determined, the average power value is increased or decreased according to the actual required power of the electric vehicles 105 corresponding to the charging units, and then, the power is distributed to the charging units according to the increased or decreased power values.

In addition, two thresholds, that is, a first threshold and a second threshold, can be set. Then, it is determined whether the actual required power of an electric vehicle is less than the first threshold and the actual required power of another electric vehicle is greater than the second threshold; if yes, the electric vehicle whose actual required power is less than the first threshold is distributed with a power value corresponding to the actual required power of the electric vehicle, and an excess power value is correspondingly distributed to the electric vehicle whose actual required power is greater than the second threshold. Where the first threshold may be 30% to 50% of the average power value. For example, the first threshold can be 40% of the average power value. The second threshold may be 80% to 100% of the average power value. For example, the second threshold can be 95% of the average power value.

In addition, the actual required power of each of the electric vehicles can be determined when the charging units start to connect to the electric vehicles, and then a power value distributed to each charging unit can be adjusted according to the actual required power of the electric vehicles currently being charged. That is, the dynamic distribution mode can be activated when a new electric vehicle is connected to a charging unit. Alternatively, it is determined for every preset time period whether the power currently distributed to each charging unit needs to be adjusted.

In a specific embodiment, the orderly charging mode is the FIFO distribution mode, and the charging module includes a first charging unit and a second charging unit, the first charging unit is used to charge a first electric vehicle, the second charging unit is used to charge a second electric vehicle, and the first electric vehicle is connected to the power distribution system before the second electric vehicle.

The power management module 104 determines the required power of the first charging unit according to the initial required charging power of the first electric vehicle, and after the second electric vehicle is connected, subtracts the required power of the first charging unit from the total supply power to obtain an upper limit value of the required power of the second charging unit.

Specifically, the FIFO (First In First Out) distribution mode can also be adopted to preferentially distribute power to an electric vehicle that is connected firstly, and to distribute power to an electric vehicle that is connected next after the charging of the first electric vehicle is completed. That is, according to the access sequences of the electric vehicles, power values are preferentially distributed in order.

Specifically, when the first electric vehicle is connected, the actual required power of the electric vehicle can be determined according to the initial required charging power of the electric vehicle, and then the required power of the charging unit connected to the first electric vehicle is determined according to the actual required power of the first electric vehicle, and then a corresponding power is preferentially distributed to the charging unit connected to the first electric vehicle. After the new electric vehicle (the second electric vehicle) is connected, subtracting the distributed power of the charging unit connected to the first electric vehicle from the total supply power to obtain an upper limit value of the power distributed for the charging unit connected to the second electric vehicle.

In a specific embodiment, the orderly charging mode is the dynamic proportional mode, and the power management module 104 distributes power to each of the charging units according to the total supply power and the total required power in combination with a required ratio, where the required ratio is obtained by dividing the required power of the corresponding charging unit by the total required power of the charging units.

Specifically, a required ratio of a charging unit is the ratio of the required power of the charging unit to the total required power, and the required power of each charging unit maybe related to the initial required charging power of an electric vehicle to which the each charging unit is connected. The higher the initial required charging power of an electric vehicle, the more power is required, and therefore, the required power of a corresponding charging unit is also more. Conversely, the lower the initial required charging power of an electric vehicle, the less power is required, and therefore, the required power of a corresponding charging unit is also less. Therefore, required power of a charging unit is proportional to the actual required power of a corresponding electric vehicle, and the power can be distributed to the charging unit according to the required ratio of each charging unit. For example, there are three charging units A, B, and C, and corresponding required power of the three charging units are 100 W, 200 W, and 300 W, respectively, and the total supply power is 1200 W. Then a required ratio corresponding to the charging unit A is 100/(100+200+300)=1/6, a required ratio corresponding to the charging unit B is 1/3, and a required ratio corresponding to the charging unit C is 1/2, and in this case, the power distributed to the charging unit A is 200 W, power distributed to the charging unit B is 400 W, and power distributed to the charging unit C is 600 W.

In a specific embodiment, the charging module 103 charges the electric vehicles 105 in a wireless manner, a wired manner, or a hybrid manner of a wired manner and a wireless manner. That is, a function of charging the electric vehicles 105 can be realize by connecting charging guns to charging gun holders of the electric vehicles 105, or connecting the electric vehicles 105 through radio waves. There are multiple ways for a charging users to choose, which improves convenience and flexibility of charging, and improves the charging experience of users.

In a specific embodiment, some of the charging units in the charging module 103 adopt an all-in-one architecture or a cabinet-dispenser architecture, and the electric vehicles 105 are charged in a wired manner.

Specifically, if the cabinet-dispenser architecture is adopted, an expansion of electric power can be realized, thereby increasing the total supply power.

In a specific embodiment, the charging units include a power cabinet and a dispenser connected to the power cabinet, the power cabinet is electrically connected to the alternating-current source 101 and the energy storage device 102, and the dispenser is electrically connected to the electric vehicles 105.

In a specific embodiment, the energy storage device 102 includes a battery pack for high-power energy storage, and a battery of the battery pack includes a lead-acid battery, a lithium battery, or a sodium-sulfur battery.

In a specific embodiment, the energy storage device 102 further includes an alternating current-direct current converter (AC-DC converter), a switch, and a protection device. During the charging and discharging of the energy storage device 102, the alternating current-direct current converter is controlled by the power management module 104 and works either in a rectification mode or an inverter mode.

In a specific embodiment, the charging units charge the electric vehicles according to the acquired distributed power and respective charging efficiency.

Specifically, a charging efficiency of each charging unit is closely related to a situation of the charging unit itself, and various factors may cause the charging efficiency of each charging unit to be different. When charging the electric vehicles, the charging units charge the electric vehicles according to the products of the obtained distributed power and the charging efficiencies.

Figure 2:
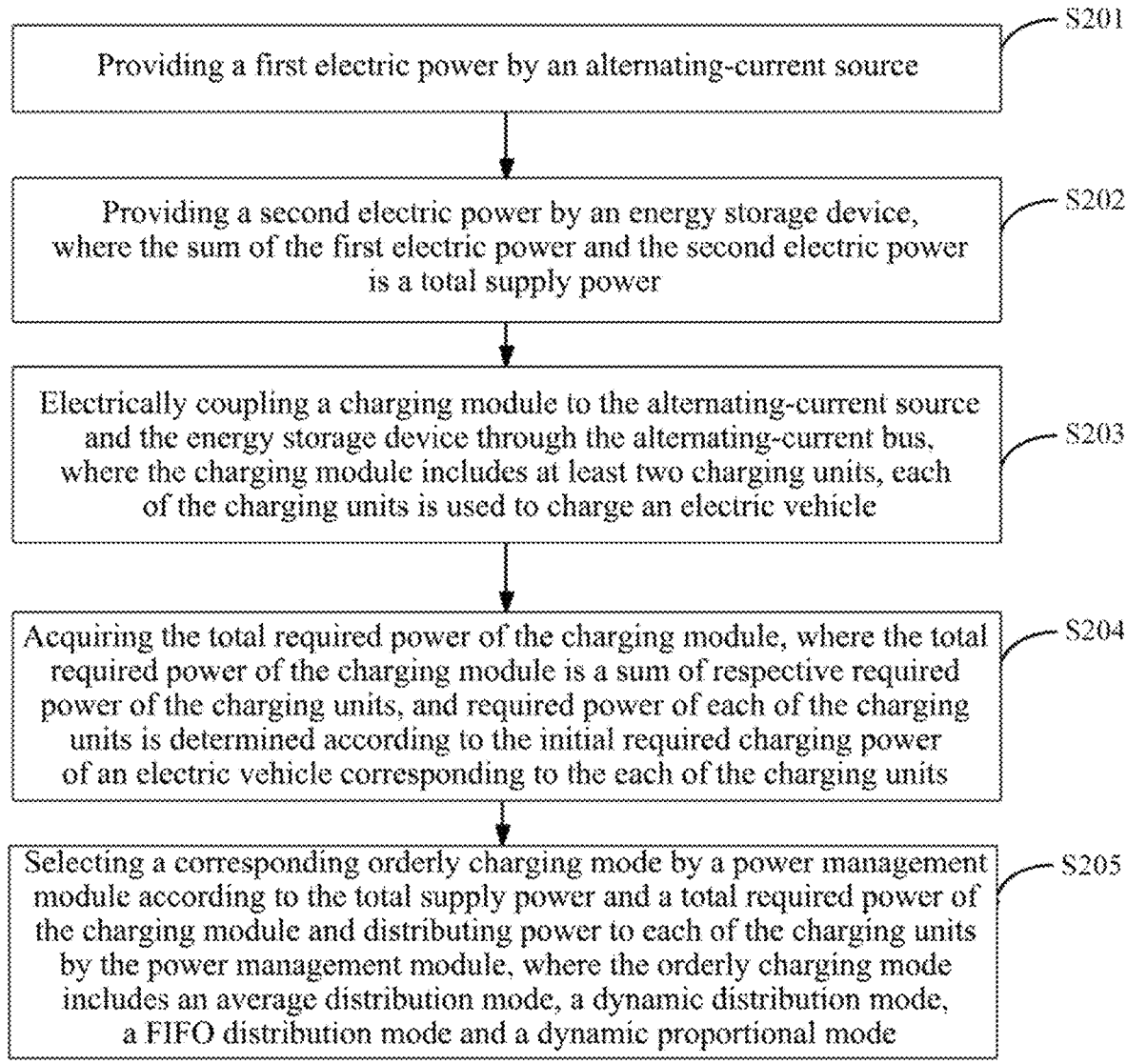
FIG. 2 is a schematic flowchart of a control method for charging multiple electric vehicles using a power distribution system according to an embodiment of the present disclosure.

FIG. 2 is a schematic flowchart of a control method for charging multiple electric vehicles using a power distribution system according to an embodiment of the present disclosure. The power distribution system includes the alternating-current source 101, the energy storage device 102, the charging module 103 and the power management module 104 as shown in FIG. 1. As shown in FIG. 2, the method of the present embodiment may include following steps:

S201: providing a first electric power by the alternating-current source;

S202: providing a second electric power by the energy storage device, where the sum of the first electric power and the second electric power is a total supply power.

Specifically, the total supply power can be determined by using the alternating-current source and the energy storage device to charge the electric vehicles together, which expands a range of the total supply power and improves a charging efficiency for charging the electric vehicles.

S203: electrically coupling the charging module to the alternating-current source and the energy storage device through the alternating-current bus, where the charging module includes at least two charging units, each of the charging units is used to charge an electric vehicle.

S204: acquiring the total required power of the charging module, where the total required power of the charging module is a sum of respective required power of the charging units, and the required power of each of the charging units is determined according to the initial required charging power of an electric vehicle corresponding to the each of the charging units.

Specifically, the required power of each of the charging units is related to the required power of the electric vehicle connected to the each of the charging units, and the required power of the electric vehicle is related to the initial required charging power of the electric vehicle. That is, the required power of the electric vehicle is the initial required charging power of the electric vehicle, and the initial required charging power is obtained by subtracting the existing power of the electric vehicle itself from the total capacity of the battery in the electric vehicle. Then, the required power of the charging unit is determined according to the charging efficiency of the charging unit and the required power of the electric vehicle.

S205: selecting, by the power management module, a corresponding orderly charging mode according to the total supply power and the total required power of the charging module, where the orderly charging mode includes an average distribution mode, a dynamic distribution mode, a FIFO distribution mode and a dynamic proportional mode.

Specifically, when the total required power of the connected electric vehicles 105 exceeds the sum of the first electric power provided by the alternating-current source 101 and the second electric power provided by the energy storage device 102, in order to improve a charging efficiency of the electric vehicles and to avoid an excessive discharge of the energy storage device 102 and thus a damage to the energy storage device 102, the electric vehicles 105 may be charged in the orderly charging mode as disclosed in the present disclosure.

As for the method of FIG. 2, some embodiments of the present disclosure are provided below.

In a specific embodiment, the orderly charging mode is the average distribution mode, and the power management module averagely distributes power to each of the charging units according to the total supply power and the total required power in combination with the number of the charging units, the averagely distributed power satisfies the relationship:

$$P=(P_u+P_e)/n;$$

where P is the average distributed power acquired by each of the charging units, $P_u$ is the first electric power, $P_e$ is the second electric power, n is the number of the charging units.

In a specific embodiment, the orderly charging mode is the dynamic distribution mode, and the power management module calculates an average power value of each of the charging units according to the total supply power and the total required power in combination with the number of the charging units, and then increases or decreases the average power value according to respective actual required power of the electric vehicles corresponding to the charging units, and distributes power to the charging units according to the increased or decreased power value.

In a specific implementation, the orderly charging mode is the FIFO distribution mode, the charging module includes a first charging unit and a second charging unit, the first charging unit is used to charge a first electric vehicle, the second charging unit is used to charge a second electric vehicle, and the first electric vehicle is connected to a power distribution system before the second electric vehicle.

The power management module determines required power of the first charging unit according to the initial required charging power of the first electric vehicle, and after the second electric vehicle is connected, subtracts the required power of the first charging unit from the total supply power to obtain an upper limit value of required power of the second charging unit.

In a specific embodiment, the orderly charging mode is the dynamic proportional mode, and the power management module distributes power to the each of the charging units according to the total supply power and the total required power in combination with a required ratio, where the required ratio is obtained by dividing the required power of the corresponding charging unit by the total required power of the charging units. The distributed power satisfies the following relationship:

$$P_n=(P_u+P_e)P_{nd}/(P_{1d}+P_{2d}+\ldots+P_{nd});$$

where $P_n$ is the power distributed for the nth charging unit, $P_u$ is the first electric power, $P_e$ is the second electric power, and $P_{nd}$ is required power of the nth charging unit.

In a specific embodiment, the charging module charges the electric vehicles in a wireless manner, a wired manner, or a hybrid manner of a wired manner and a wireless manner. That is, the function of charging the electric vehicles 105 can be realized by connecting charging guns to charging gun holders of the electric vehicles 105, or connecting to the electric vehicles 105 through radio waves. There are multiple ways for a charging user to choose, which improves convenience and flexibility of charging, and improves the charging experience of users.

In a specific embodiment, the energy storage device 102 includes a battery pack for high-power energy storage, and a battery of the battery pack includes a lead-acid battery, a lithium battery, or a sodium-sulfur battery.

In a specific embodiment, the energy storage device 102 further includes an alternating current-direct current converter, a switch, and a protection device. During the charging and discharging of the energy storage device 102, the alternating current-direct current converter is controlled by the power management module 104 and works either in a rectification mode or an inverter mode, respectively. In a specific embodiment, the charging units charge the electric vehicles according to the acquired distributed power and respective charging efficiency.

Those of ordinary skill in the art may understand that all or part of the steps of the method embodiments may be implemented by program instructions related hardware. The foregoing program may be stored in a computer-readable storage medium. When the program is executed, the steps included in the foregoing method embodiments are performed; and the foregoing storage medium includes: ROM, RAM, magnetic disks, or optical discs and other media that can store program codes.

Finally, it should be appreciated that the above embodiments are only used to illustrate the technical solution of the present disclosure, but not limited the present disclosure. Although the present disclosure has been described in detail with reference to the foregoing embodiments, those skilled in the art should understand that they can still modify the technical solutions described in the foregoing embodiments, or equivalently replace some or all of technical features therein; and these modifications or replacements do not make the essence of corresponding technical solutions depart from the scope of the technical solutions of the embodiments of the present disclosure.

What is claimed is:

1. A power distribution system for charging multiple electric vehicles, comprising:
    an alternating-current source, configured to provide a first electric power;
    an energy storage device, configured to provide a second electric power, wherein the first electric power and the second electric power together constitute a total supply power of the system;
    a charging module, comprising multiple charging units, wherein each of the charging units is electrically coupled to the alternating-current source and the energy storage device through an alternating-current bus, and the charging units are used to charge the electric vehicles; and
    a power management module, performing a signal transmission with the alternating-current source, the energy storage device and the charging module through a signal bus, and configured to select a corresponding orderly charging mode according to the total supply power and a total required power of the charging module and distribute power to each of the charging units, wherein the orderly charging mode comprises an average distribution mode, a dynamic distribution mode, a first in first out (FIFO) distribution mode and a dynamic proportional mode, the total required power of the charging module is a sum of respective required power of the charging units, and the required power of each of the charging units is determined according to an initial required charging power of an electric vehicle corresponding to the each of the charging units.

2. The power distribution system according to claim 1, wherein the orderly charging mode is the average distribution mode, and
    the power management module averagely distributes power to each of the charging units according to the total supply power and the total required power in combination with the number of the charging units.

3. The power distribution system according to claim 1, wherein the orderly charging mode is the dynamic distribution mode, and
    the power management module calculates an average power value of each of the charging units according to the total supply power and the total required power in combination with the number of the charging units, and then increases or decreases the average power value according to respective actual required power of the electric vehicles corresponding to the charging units, and then distributes power to the charging units according to the increased or decreased power value.

4. The power distribution system according to claim 1, wherein the orderly charging mode is the FIFO distribution mode, the charging module comprises a first charging unit and a second charging unit, the first charging unit is used to charge a first electric vehicle, the second charging unit is used to charge a second electric vehicle, and the first electric vehicle is connected to the power distribution system before the second electric vehicle, and
    the power management module determines the required power of the first charging unit according to the initial required charging power of the first electric vehicle, and after the second electric vehicle is connected, subtracts the required power of the first charging unit from the total supply power to obtain an upper limit value of required power of the second charging unit.

5. The power distribution system according to claim 1, wherein the orderly charging mode is the dynamic proportional mode, and
    the power management module distributes power to each of the charging units according to the total supply power and the total required power in combination with a required ratio of each of the charging units, wherein the required ratio of each charging unit is obtained by dividing the required power of a corresponding charging unit by the total required power.

6. The power distribution system according to claim 1, wherein the charging module charges the electric vehicles in a wireless manner, a wired manner, or a hybrid manner of a wired manner and a wireless manner.

7. The power distribution system according to claim 6, wherein part of the charging units in the charging module adopt an all-in-one architecture or a cabinet-dispenser architecture, and charge the electric vehicles in a wired manner.

8. The power distribution system according to claim 7, wherein the charging units comprise a power cabinet and a dispenser connected to the power cabinet, the power cabinet is electrically connected to the alternating-current source and the energy storage device, and the dispenser is electrically connected to the electric vehicles.

9. The power distribution system according to claim 1, wherein the energy storage device comprises a battery pack for high-power energy storage, and the battery pack comprises a lead-acid battery, a lithium battery, or a sodium-sulfur battery.

10. The power distribution system according to claim 1, wherein the charging units charge the electric vehicles according to the acquired power distributed by the power management module and the charging efficiencies.

11. A control method for charging multiple electric vehicles by using the power distribution system according to claim 1, the power distribution system comprises the alternating-current source, the energy storage device, the charging module and the power management module, wherein the control method comprises the following steps:
   providing the first electric power by the alternating-current source;
   providing the second electric power by the energy storage device, wherein the sum of the first electric power and the second electric power is the total supply power;
   electrically coupling the charging module to the alternating-current source and the energy storage device through the alternating-current bus, wherein the charging module comprises at least two charging units, each of the charging units is used to charge an electric vehicle;
   acquiring the total required power of the charging module, wherein the total required power of the charging module is a sum of respective required power of the charging units, and the required power of each of the charging units is determined according to the initial required charging power of an electric vehicle corresponding to the each of the charging units; and
   selecting a corresponding orderly charging mode by the power management module according to the total supply power and the total required power, and distributing power to each of the charging units, wherein the orderly charging mode comprises an average distribution mode, a dynamic distribution mode, a FIFO distribution mode and a dynamic proportional mode.

12. The control method according to claim 11, wherein the orderly charging mode is the average distribution mode, and the power management module averagely distributes power to each of the charging units according to the total supply power and the total required power in combination with the number of the charging units, and the averagely distributed power satisfies the relationship:

$$P=(P_u+P_e)/n;$$

wherein P is the average distributed power acquired by each of the charging units, $P_u$ the first electric power, $P_e$ is the second electric power, and n is the number of the charging units.

13. The control method according to claim 11, wherein the orderly charging mode is the dynamic distribution mode, and the power management module calculates an average power value of each of the charging units according to the total supply power and the total required power in combination with the number of the charging units, and then increases or decreases the average power value according to respective actual required power of the electric vehicles corresponding to the charging units, and distributes power to the charging units according to the increased or decreased power value.

14. The control method according to claim 11, wherein the orderly charging mode is the FIFO distribution mode, the charging module comprises a first charging unit and a second charging unit, the first charging unit is used to charge a first electric vehicle, the second charging unit is used to charge a second electric vehicle, and the first electric vehicle is connected to the power distribution system before the second electric vehicle, and
   the power management module determines the required power of the first charging unit according to the initial required charging power of the first electric vehicle, and after the second electric vehicle is connected, subtracts the required power of the first charging unit from the total supply power to obtain an upper limit value of the required power of the second charging unit.

15. The control method according to claim 11, wherein the orderly charging mode is the dynamic proportional mode, and the power management module distributes power to each of the charging units according to the total supply power and the total required power in combination with a required ratio of each of the charging units, wherein the required ratio of each charging unit is obtained by dividing the required power of a corresponding charging unit by the total required power, and the distributed power satisfies the following relationship:

$$P_n=(P_u+P_e)P_{nd}/(P_{1d}+P_{2d}+\ldots+P_{nd});$$

wherein $P_n$ is the distributed power acquired by the nth charging unit, $P_u$ is the first electric power, $P_e$ is the second electric power, and $P_{nd}$ is the required power of the nth charging unit.

16. The control method according to claim 11, wherein the charging module charges the electric vehicles in a wireless manner, a wired manner, or a hybrid manner of a wired manner and a wireless manner.

17. The control method according to claim 16, wherein part of the charging units in the charging module adopt an all-in-one architecture or a cabinet-dispenser architecture, and charge the electric vehicles in a wired manner.

18. The control method according to claim 17, wherein the charging units comprise a power cabinet and a dispenser connected to the power cabinet, the power cabinet is electrically connected to the alternating-current source and the energy storage device, and the dispenser is electrically connected to the electric vehicles.

19. The control method according to claim 11, wherein the energy storage device comprises a battery pack for high-power energy storage, and the battery pack comprises a lead-acid battery, a lithium battery, or a sodium-sulfur battery.

20. The control method according to claim 11, wherein the charging units charge the electric vehicles according to the acquired power distributed by the power management module and the charging efficiencies.

* * * * *